May 1, 1934.  R. M. UPTON  1,956,601

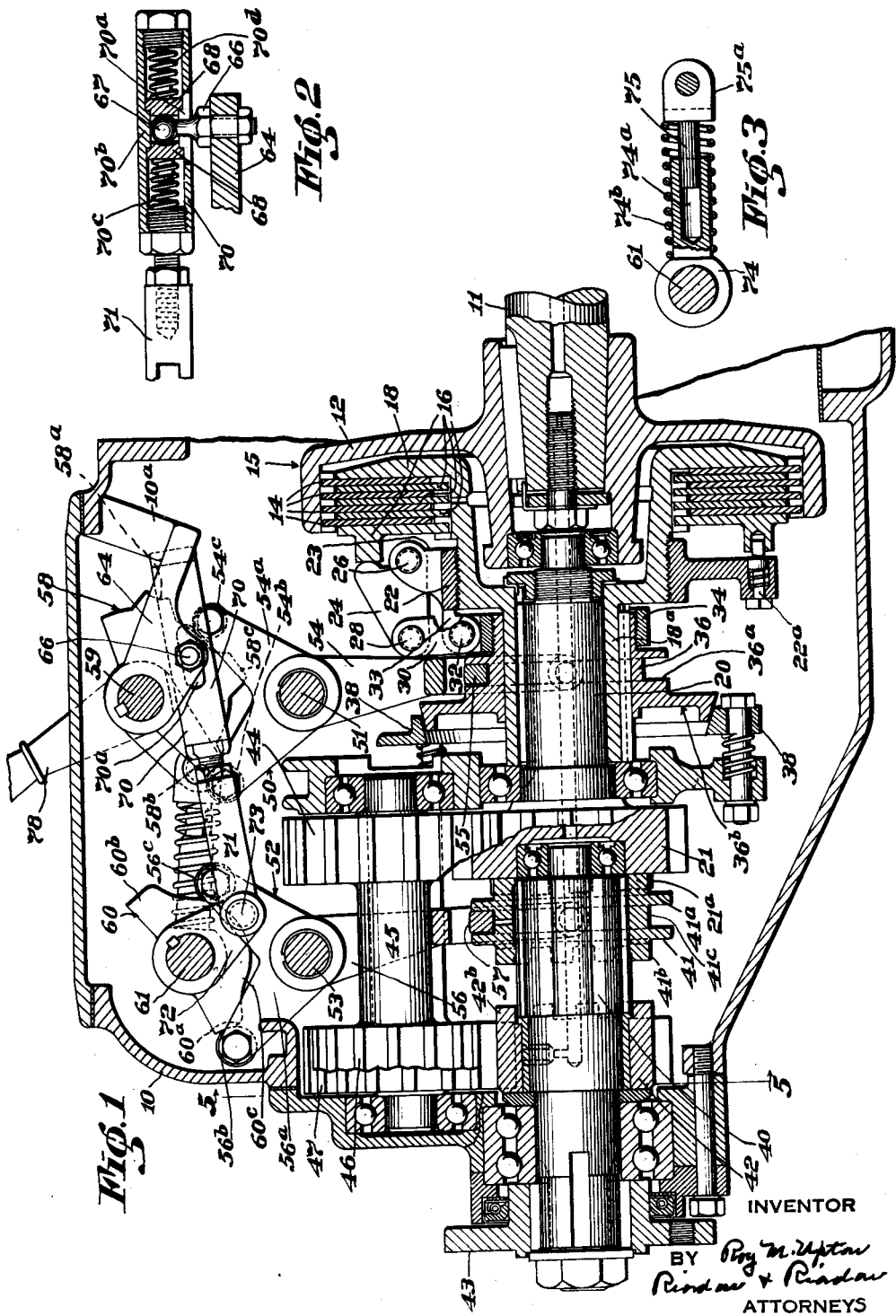

REVERSE GEAR AND CLUTCH MECHANISM

Filed Dec. 2, 1932  2 Sheets-Sheet 2

Patented May 1, 1934

1,956,601

UNITED STATES PATENT OFFICE 1,956,601

REVERSE GEAR AND CLUTCH MECHANISM

Roy M. Upton, Miami, Fla., assignor to Upton Gear Company, Miami, Fla., a corporation of Florida Application December 2, 1932, Serial No. 645,457

18 Claims. (Cl. 192—3.5)

This invention relates to a reverse gear and clutch operating mechanism for use in power transmission, for example for transmitting power from a motor to a driven element such as the propeller shaft of a boat.

The invention relates more particularly to an improved reverse gear and clutch operating mechanism of the general type described and shown in my co-pending application, Serial No. 477,409 filed August 23, 1930, now matured into U. S. Letters Patent No. 1,889,909, Dec. 6, 1932, of which this application is a continuation in part and to which reference is made. The primary object of this invention is to provide and secure such an improved mechanism, wherein, by additional and improved control means, improved operating characteristics are secured under any and all conditions encountered in practical use. These and other advantages will be understood by those skilled in the art from the following description and from the drawings in which,—

Fig. 1 is a vertical, longitudinal section showing a reverse gear and clutch operating mechanism in accordance with this invention;

Fig. 2 is a detailed view, also in cross section, showing what is herein termed the compensating means;

Fig. 3 is a longitudinal section showing what is herein termed the equalizing means;

Figure 4:
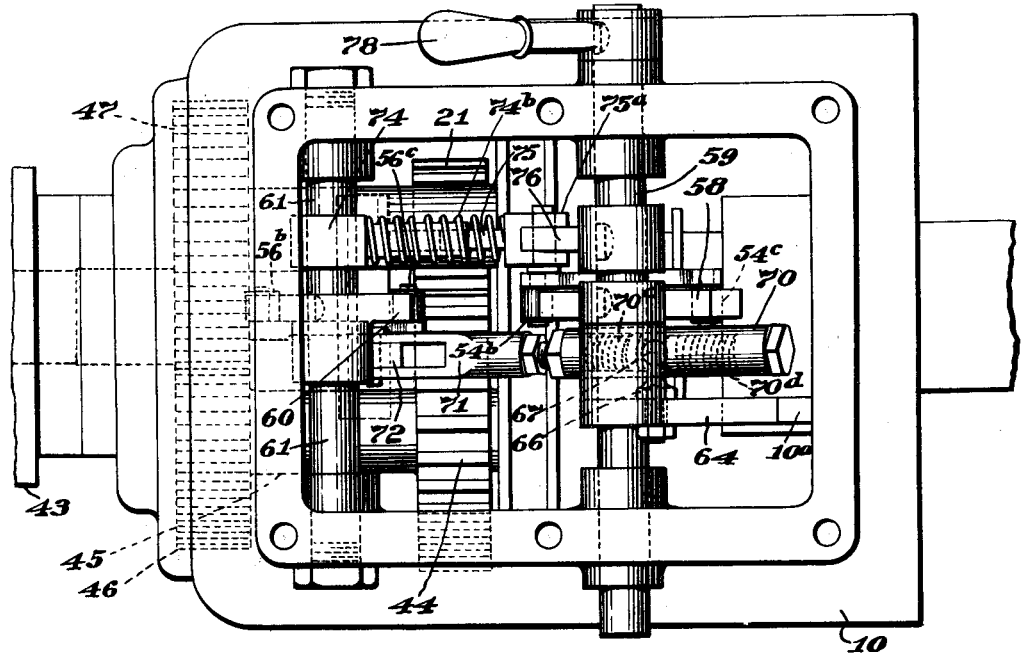
Fig. 4 is a top plan view of the operating means for the device but, for purposes of clarity, not showing certain underlying parts of the device.
Figure 5:
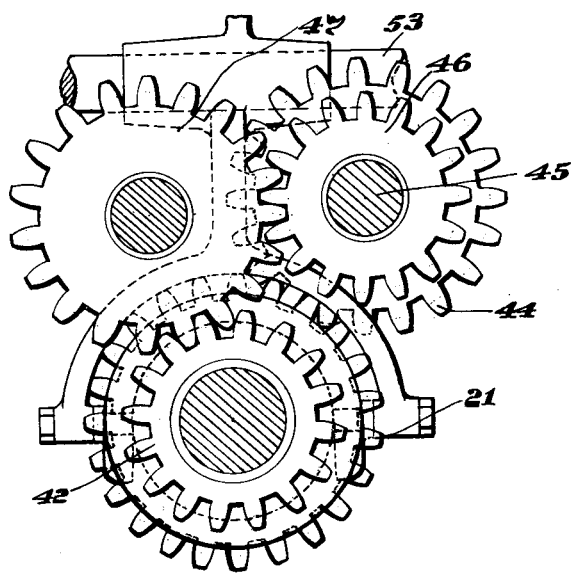
Fig. 5 is an end elevation of the gears.

Referring to the drawings which illustrate the preferred structure, and particularly to Figs. 1 and 4, a housing 10 contains mounted therein the various parts of the device which are driven from and by means of the drive shaft 11. The shaft 11 projects into the reverse gear housing 10 and is provided within the latter with a friction clutch drum 12 suitably affixed to the shaft 11 and within the drum 12 is rotatively carried and affixed a series of axially slidable annular clutch rings 14 (driving rings) locked to turn with the drum 12, the entire friction clutch being generally designated as 15. Another series of axially slidable annular-clutch rings 16 (driven rings) is carried and locked to turn with the flanged collar 18, said collar having a rearwardly projecting hollow shaft portion 18a keyed as shown to the shaft 20. Upon its externally screw threaded portion, the collar 18 carries a surrounding internally threaded collar 22, and projecting outwardly from the collar 22 is a plurality of spaced pairs of lugs 23. Rotation of the collar 22 relative to the flanged collar 18 is normally prevented by means of the spring pressed pin 22a which projects into a recess in the rearward clutch ring 16 as shown. Between each pair of lugs 23 is pivotally connected one end of an angular toggle or clutch actuating lever member 24, bearing upon the projection on the rearward clutch ring 16. Each such member 24 is connected with a pair of lugs 23 (but one of which is shown) by means of a pivot pin 26. Pivotally connected to the rearward ends of each actuating member 24 (usually three of such members are employed though but one appears in Fig. 1), by means of a pivot pin 28, are pairs of links 30 which are pivotally connected at their opposite ends by means of pivot pins 32 with lugs 33 projecting radially from a collar 34. The lugs 33 each have a forwardly projecting portion as shown which contact the collar 22 and thus limit the extreme possible forward movement of the part 34. This collar 34 is screw threadedly mounted and hence adjustable upon a sliding collar 36 having therein a groove 36a through which the collar 36 is actuated. By this means the lever members 24 are moved to engage and release the clutch 15. The toggle links 30, by means of the threaded adjustment just referred to, may be adjusted so that their inner ends will go forward to just beyond dead center (that is with the inner pivot pins 32 slightly forward of the outer pivot pins 28), without necessitating any change or adjustment of the cam positioned clutch shifting element 50 or collar 36. The preferred clutch, as shown, is therefore toggle or lever-loaded. The collar 36 carries at its rearward end a frusto conical portion 36b. The portion 36b upon its rearward movement, when the clutch is disengaged, contacts with the non-rotatable resiliently mounted clutch brake 38 so as to stop the rotation of the hollow shaft 18a, flanged collar 18, and associated parts. The shaft 20 carries at its rearward end (preferably integral therewith) a spur gear 21, said gear having upon its rearward side a series of rearwardly projecting dogs 21a. The projecting dogs 21a are adapted to mesh with a series of dogs 41a upon the forward side of the slidable dog clutch member 41 internally splined to the shaft 40. Said member 41 also carries upon its opposite or rearward side a second series of dogs 41b adapted to mesh with a corresponding series of dogs 42b carried by the gear 42, this gear being freely rotatable with reference to the shaft 40. When the clutch 15 is engaged as shown in Fig. 1, the drive is direct from the shaft 11 through the clutch 15 which in turn drives the shaft 20 and integral gear 21, the gear 21 driving the splined shaft 40 by means of the interengaging of the dogs 21a and 41a thus rotating the dog clutch element 41 and shaft 40, the shaft 40 having keyed thereto the usual flanged coupling 43 from which the drive may be taken. The description so far has been solely with reference to the drive in one direction (say forward), but it will be seen that when the dog clutch 41 is moved to its rearward position, with the dogs 41b in driving engagement with the dogs 42b, the drive will be through the shaft 20 and gear 21 as before, but in this case the drive will be from the gear 21 to the gear 44, thence through the shaft 45 and gear 46 (Fig. 5) meshing with the intermediate idle gear 47 which in turn drives the gear 42. The gear 42 now drives the shaft 40 through the engagement of the dogs 42b and 41b thus serving to rotate the internally splined dog clutch element 41 and the splined shaft 40 but in the reverse direction to the straight-line forward drive previously described. It will be noted the gears are in constant mesh with the clutch 41 serving to make or break their effective driving connection.

The control of the friction clutch 15 and the dog clutch 41 is through the shifting elements generally designated 50 and 52 respectively. The element 50 pivotally mounted upon the shaft 51 is adapted to move the clutch 15 in and out of engagement; and the element 52, pivotally mounted upon the shaft 53, is adapted to move the dog clutch 41 to one or the other of its two respective driving positions or to an intermediate idling position in which the dogs 41b and 41a are out of operative engagement with the respective opposing dogs 42b and 21a. The pivotally mounted shifting element 50 carries at its lower end a yoke 54 which, through the usual split collar 55 and pair of lugs (not fully shown) actuates in turn the collar 36 by contact in the groove 36a. Similarly the yoke 56 through the split collar 57 and lugs (not fully shown) actuates the dog clutch 41 by contact in the groove 41c. The shifting elements 50 and 52 have at the upper ends thereof yokes 54a and 56a at right angles to the lower yokes 54 and 56, as described in my application before mentioned, and said upper ends carry rollers 54b, 54c, 56b and 56c for contact with and actuation by the respective shifting cams 58 and 60. The friction clutch actuating cam 58 is affixed to and oscillated by a transverse shaft 59 and the dog clutch actuating cam 60 is affixed to and oscillated by the transverse shaft 61 through connections now to be described.

In addition to the cam 58 the shaft 59 has affixed thereto an arm 64. This arm 64 carries affixed thereto a projecting member 66 terminating in a ball portion 67 (see Figs. 2 and 4). The ball portion 67 when in central position is held between two spring pressed socket members 68 which are slidably carried in a tubular member 70. It will be seen that the member 70 has a longitudinal slot 70a in the side thereof so as to permit a relative longitudinal movement of the member 66 with reference to the tube 70. The springs 70c and 70d in the tube 70 are held and backed up as shown so that they tend to urge and hold the slidable socket members 68, or one of them, close to ball 67 and/or the internal stop 70b. The tube 70 with its contained parts is, by means of the adjustable extension 71, affixed to the arm 72 to which it is pivoted at 73. The arm 72 is integral with and rotates the cam 60. For convenience this portion of the device is termed the compensating means and the action and purpose thereof will hereinafter appear. In addition to the arm 72 mounted on the shaft 61, the shaft 61 carries in rotative engagement therewith, a member 74 having a tubular sidewise extended member 74a. This tubular section carries upon its exterior a spring 74b and its bore slidably receives a rod 75 terminating in a forked portion 75a pinned and pivotally affixed to an arm 76, the arm 76 being affixed to and rotated by the shaft 59. This unit just described because of the spring 74b tends to hold the clutch controlling shaft 59 and cam 58 at their full limit of movement in either direction upon corresponding movement to forward or reverse position, but, since the equalizer device functions as a toggle, the spring at maximum compression exerts no turning influence because the toggle is then at dead center. The extreme movement of the shaft 59 is limited by the outer end of the arm 64 which encounters the stop 10a on the housing 10 or the shaft 51 according to which direction the shaft 59 is moved. The pressure required to operate the clutch 15 and shift the clutch 41 from reverse to forward position or vice versa is also rendered more uniform as the equalizer promotes an even feeling when disengaging the clutch until neutral is reached when the roller 54c on the clutch yoke enters the groove in the lobe 58a of the friction clutch control cam 58 due to the spring pressed clutch brake 38, and thus holds the lever 78 in neutral position. The lobes 58b and 58c of the cam 58 are preferably formed so that the greatest lift or height of each of said lobes passes by the contacting portion of the roller 54b just before the lever 78 reaches the end of its movement to either of its extreme positions, the portions of greatest height of the lobes 58b and 58c are therefore on the adjacent sides of said lobes. The purpose of these portions is to not only push the clutch all the way in and until the toggle links have passed dead center, but to cause a release of pressure (or at least a part of it) on the roller 54b after the cam has turned slightly further than necessary for full clutch engagement. These portions though not clearly and fully shown in the drawings Fig. 1 are, respectively, at the lower or right hand portion of the lobe 58b having passed the roller 54b in a counterclockwise movement, and at the lower or left hand portion of the lobe 58c ready to pass the roller 54c upon clockwise movement.

The entire device is thus operated from the single lever 78 affixed to the shaft 59. In the position of the device in Fig. 1 the unit is in what will be called the forward drive,—that is with the direct or straight-line drive in effect. The lever under these conditions is in the position as shown.

With the device in the position as shown in Fig. 1 the dog shifting clutch 41 is held in engagement by the contact of the lobe 60a and the cam 60 with the roller 56b, and the friction clutch 15 is shown as having been moved and locked into engaging relation by the contact of the lobe 58b of the cam 58 with the roller 54b. When the lever 78 is moved to vertical position, the friction clutch 15 is moved into neutral or disengaged position by the contact of the lobe 58a with the roller 54c. It will be noted that the lobe 58a has quite a pronounced depression at the end thereof which receives the roller 54c and, due to the spring pressed clutch brake, as before described, the friction clutch and entire control means is held in a neutral or mid position. Upon this movement of the lever to its vertical position with consequent movement of the cams 58 and 60 and connecting linkage, the clutch 15 and the dog clutch 41 are both disengaged, the dog clutch 41 being moved to its mid or neutral position and as this takes place the clutch brake 38 receives and contacts with the friction member 36b and brings the driven part of the clutch 15 to rest. When the lever 78 is moved from the vertical to its right hand position, the lobe 58c moves the roller 54b and hence the shifting element 50 to the same position as shown in Fig. 1 resulting in an engagement of the friction clutch 15, and through the connecting linkage the lobe 60b of the cam 60 moves the roller 56c downwardly, and hence the shifting element 52 thus sliding the dog clutch 41 rearwardly and into driving engagement with the dogs 42b of the gear 42. If the lever 78 is returned to its left hand position (as viewed in Fig. 1) the clutch 15 becomes engaged and the dog clutch 41 either engages or tends to become engaged, but if, however, the dogs 41a meet end to end with the dogs 21a when the movement is initiated, the compensating link assembly (spring 70d) permits the friction clutch 15 to be engaged though the dogs 41a have not entered and hence have not actively engaged the driving faces of the dogs 21a. Upon the initiation of rotation of the gears, however, (since the clutch 15 has become engaged) driving engagement of the dog clutch 41 at once follows and without clashing or injury to the dogs or any part of the device. The compensating link may have occasion to function similarly when the lever 78 is moved to operate the device in its reverse direction of drive. If the dogs 41b of the dog clutch 41 at once enter into driving engagement with the dogs 42b, the compensating link, due to its relatively stiff and independent springs, functions as though it were a rigid device, but, should the dogs not instantly engage, the yieldable characteristic (spring 70c) of the compensating link again comes into play and permits and provides for a driving engagement. The compensating means thus permits the immediate full throw of the lever 78, prevents injury to the device, and provides for smooth, normal and certain driving engagement despite an initial failure of the dogs to mesh and drive. At the same time the compensating link provides a normally firm though, when necessary, yielding connection between the friction clutch control and the dog clutch control since the independently spring pressed sockets 68 cannot advance beyond the central stop 70b. Were it not for this stop or an equivalent the ball 67 in its movement from mid position would be spring pressed by both springs and hence balanced from opposite sides which would detract from the normally firm though, when necessary, yielding condition of the connection between these devices.

Although the preferred embodiment of the invention is as illustrated and described, it is to be understood that changes may be employed so long as such changes fall within the scope of the invention, for example it is contemplated that the form and location of the compensating device may be changed and applied say to the dog clutch or the members engaged by it, a sliding gear, or intermediate operating means.

Having described my invention, what I claim is:—

1. In a mechanism for operating a clutch and reverse gearing, a pivotally mounted shifting element for the clutch and including an upper and lower yoke disposed at right angles to each other, a pivotally mounted shifting element for the reverse gearing and including an upper and lower yoke disposed at right angles to each other, a rotatably mounted cam operating in and coacting with the upper yoke and for controlling the shifting element for the clutch, a rotatably mounted cam operating in and coacting with the upper yoke and for controlling the shifting element for the reverse gearing, means for oscillating said cams in unison, a lobe on the cam for controlling the reverse gearing shifting element to shift the latter in one direction when the the cams are at their limits of movement in one direction, a lobe on the cam for controlling the reverse gearing shifting element to shift the latter in the opposite direction when the cams are at their limits of movement in the opposite direction, a pair of lobes on the cam for the clutch shifting element for controlling the position of the latter when said cams are at their limits of movement in either direction, and means for controlling the clutch shifting element to shift and hold the latter out of engagement when said cams are intermediate their limits of movement.

2. In a mechanism for operating a clutch and a reverse gearing, a pivotally mounted shifting element for the clutch, a pivotally mounted shifting element for the reverse gearing, each of said shifting elements being formed at one end with a yoke, a rotatably mounted cam for controlling the shifting element for the clutch, a rotatably mounted cam for controlling the shifting element for the reverse gearing, means for oscillating said cams in unison, a lobe on the cam for controlling the reverse gearing shifting element for engagement with one end portion of the latter to shift the same in one direction when the cams are at their limits of movement in one direction, a lobe on the cam for controlling the reverse gearing shifting element for engagement with the opposite end portion of the latter to shift the same in the opposite direction when the cams are at their limits of movement in the opposite direction, a pair of lobes on the cam for the clutch shifting element for controlling the position of the latter when said cams are at their limits of movement in either direction, and means for controlling the clutch shifting element to shift and hold the latter out of engagement when said cams are intermediate their limits of movement.

3. In a mechanism for operating a clutch and a reverse gearing, a pivotally mounted shifting element for the clutch, a pivotally mounted shifting element for the reverse gearing, each of said shifting elements being formed at one end with a yoke, a rotatably mounted cam for controlling the shifting element for the clutch, a rotatably mounted cam for controlling the shifting element for the reverse gearing, means for oscillating said cams in unison, including a pair of levers respectively mounted for movement with said cams and a link connecting said levers, a lobe on the cam for controlling the reverse gearing shifting element for engagement with one end portion of the latter to shift the same in one direction when the cams are at their limits of movement in one direction, a lobe on the cam for controlling the reverse gearing shifting element for engagement with the opposite end portion of the latter to shift the same in the opposite direction when the cams are at their limits of movement in the opposite direction, a pair of lobes on the cam for the clutch shifting element for controlling the position of the latter when said cams are at their limits of movement in either direction, and means for controlling the clutch shifting element to shift and hold the latter out of engagement when said cams are intermediate their limits of movement.

4. In a mechanism for operating a clutch and a reverse gearing, a pivotally mounted shifting element for the clutch and an upper and lower yoke disposed at right angles to each other, a pivotally mounted shifting element for the reverse gearing and an upper and lower yoke disposed at right angles to each other, a rotatably mounted cam operating in and coacting with the upper yoke and for controlling the shifting element for the clutch, a rotatably mounted cam operating in and coacting with the upper yoke and for controlling the shifting element for the reverse gearing, means including a lever for oscillating said cams in unison, said cam for controlling the reverse gearing shifting element having means for shifting the latter in opposite directions when said cams are at their limits of movement, a pair of lobes on the cam for the clutch shifting element for controlling the position of the latter when said cams are at their limits of movement in either direction, and means for controlling the clutch shifting element to shift and hold the latter out of engagement when said cams are intermediate their limits of movement.

5. In a mechanism for operating a clutch and reverse gearing, a pivotally mounted shifting element for the clutch and including a lower yoke disposed at right angles to and controlling the shaft of the driven side of said clutch, a pivotally mounted shifting element for the gearing and including a lower yoke disposed at right angles to and controlling said shifting element for the gearing, a rotatably mounted cam coacting with and controlling the shifting element for the clutch, a rotatably mounted cam coacting with and controlling the shifting element for the gearing, means for normally oscillating said cams in unison though providing a temporarily delayed oscillation of the gearing cam when the movement of the shifting element for the gearing is obstructed, a lobe on the cam for controlling the reverse gearing shifting element to shift the latter in one direction when the cams are at their limits of movement in one direction, a lobe on the cam for controlling the gearing shifting element to shift the latter in the opposite direction when the cams are at their limits of movement in the opposite direction, a pair of lobes on the cam for the clutch shifting element for controlling the position of the latter when said cams are at their limits of movement in either direction, and means for controlling the clutch shifting element to hold the clutch out of engagement when said cams are intermediate their limits of movement.

6. In a mechanism for operating a clutch and a reverse gearing, a pivotally mounted shifting element for the clutch, a pivotally mounted shifting element for the gearing, each of said shifting elements being formed at one end with a yoke, a rotatably mounted cam for controlling the shifting element for the clutch, a rotatably mounted cam for controlling the shifting element for the gearing, yieldable means for normally oscillating said cams in unison but also providing upon obstruction of the shifting element for the gearing a delayed oscillation of the gearing cam, a lobe on the cam for controlling the gearing shifting element for engagement with one end portion of the latter to shift the same in one direction when the cams are at their limits of movement in one direction, a lobe on the cam for controlling the gearing shifting element for engagement with the opposite end portion of the latter to shift the same in the opposite direction when the cams are at their limits of movement in the opposite direction, a pair of lobes on the cam for the clutch shifting element for controlling the position of the latter to engage the clutch when said cams are at their limits of movement in either direction, and means for controlling the clutch shifting element to hold the latter out of engagement when said cams are intermediate their limits of movement.

7. In a mechanism for operating a clutch and a reverse gearing, a pivotally mounted shifting element for the clutch, a pivotally mounted shifting element for the gearing, each of said shifting elements being formed at one end with a yoke, a rotatably mounted cam for controlling the shifting element for the clutch, a rotatably mounted cam for controlling the shifting element for the gearing, means for oscillating said cams in unison, including a pair of levers respectively mounted for movement with said cams and a yieldable link connecting said levers, a lobe on the cam for controlling the gearing shifting element for engagement with one end portion of the latter to shift the same in one direction when the cams are at their limits of movement in one direction, a lobe on the cam for controlling the gearing shifting element for engagement with the opposite end portion of the latter to shift the same in the opposite direction when the cams are at their limits of movement in the opposite direction, a pair of lobes on the cam for the clutch shifting element for controlling the position of the latter to engage the clutch when said cams are at their limits of movement in either direction, and means for controlling the clutch shifting element to hold the clutch out of engagement when said cams are intermediate their limits of movement.

8. In a mechanism including a friction clutch and reverse gearing, a pivotally mounted shifting element for the clutch and an upper and lower yoke disposed at right angles to each other, a pivotally mounted shifting element for the gearing having an upper and lower yoke disposed at right angles to each other, a rotatably mounted cam operating in and coacting with the upper yoke and for controlling the shifting element for the clutch, a rotatably mounted cam operating in and coacting with the upper yoke and for controlling the shifting element for the gearing, means including a lever for oscillating said cams in unison, said cam for controlling the reverse gearing shifting element having means for shifting the latter in opposite directions when said cams are at their limits of movement, a pair of lobes on the cam for the clutch shifting element for controlling the position of the latter in the same direction when said cams are at their limits of movement in either direction, means for controlling the clutch shifting element to hold the clutch out of engagement when said cams are intermediate their limits of movement, and means to restrain rotation of said friction clutch as and when moved out of engagement.

9. In a reverse gear and clutch mechanism, a housing, a drive shaft, a driven shaft, an intermediate shaft interposed between the drive shaft and driven shaft, said shafts being in axial alignment, a counter shaft and idle gear shaft above the level of said intermediate shaft, a pivotally mounted shifting element for the clutch, a pivotally mounted shifting element for the reverse gear, each of said shifting elements being formed at its lower end with a yoke, said housing having in the upper portion thereof two transverse operating shafts extending thereacross, a rotatively mounted cam on one of said operating shafts for controlling the shifting element for the clutch, a rotatively mounted cam on the other of said operating shafts for controlling the shifting element for the reverse gearing, means for oscillating the clutch cam shaft, a connection between said clutch cam shaft and said reverse gearing cam shaft to rotate the latter, and yieldable means adapted upon engagement of said clutch providing either an immediate or a delayed engagement in selective direct straight-line forward and reverse drive.

10. In a reverse gear and clutch mechanism, a housing, a drive shaft, a driven shaft, an intermediate shaft interposed between the drive shaft and driven shaft, said shafts being in axial alignment, a countershaft and idle gear shaft above the level of said intermediate shaft a pivotally mounted shifting element for the clutch, a pivotally mounted shifting element for the reverse gear, each of said shifting elements being formed at its lower end with a yoke, said housing having in the upper part therein in the upper portion thereof two transverse operating shafts, a rotatively mounted cam on one of said shafts for controlling the shifting element for the reverse gearing, means for oscillating the clutch cam shaft and the connection between said clutch cam shaft and said reverse gearing cam shaft, a clutch brake and yieldable means adapted upon engagement of said clutch providing upon engagement of said clutch either an immediate or a delayed engagement in selective straight-line and reverse drive.

11. In a reverse gear and lever-loaded clutch mechanism, a housing, a drive shaft, a driven shaft, an intermediate shaft interposed between the drive shaft and driven shaft, said shafts being in axial alignment, a pivotally mounted shifting element for the clutch, a pivotally mounted shifting element for the reverse gear, each of said shifting elements being formed at its lower end with a yoke, said housing having in the upper part therein in the upper portion thereof two transverse operating shafts, a rotatively mounted cam on one of said shafts for controlling the shifting element for the clutch, a rotatively mounted cam on the other of said shafts for controlling the shifting element for the reverse gearing, means for oscillating the clutch cam shaft and the connection between said clutch cam shaft and said reverse gearing cam shaft, a yieldable clutch brake and yieldable means providing upon engagement of said clutch an immediate or a delayed engagement in selective direct straight-line and reverse drive.

12. In a reverse gear and clutch mechanism, a housing, a drive shaft, a driven shaft, an intermediate shaft interposed between the drive shaft and driven shaft, friction clutch means operatively connecting the drive shaft with the intermediate shaft, a brake for said clutch means, a train of reversing gears operatively connected with the intermediate shaft, a sliding coupling element on the driven shaft for selective direct engagement with the intermediate shaft and with the reverse gears, independent operating means for said friction clutch and coupling element, a common actuating means for said independent operating means, and means providing upon engagement of said friction clutch means a normally firm, though when initial engagement of the sliding coupling element is obstructed, yieldable, and slightly delayed driving engagement with said driven shaft.

13. In a reverse gear and clutch mechanism, a housing, a drive shaft, a driven shaft, an intermediate shaft interposed between the drive shaft and driven shaft, positively operated lever-loaded friction clutch means operatively connecting the drive shaft with the intermediate shaft, a yieldable brake for said clutch means, reverse gears operatively connected with the intermediate shaft, a sl'd'ng coupling element on the driven shaft for selective engagement with the intermediate shaft and with the reverse gears, independent operating means for said friction clutch and coupling element, a common actuating means for said independent operating means, and means providing a firm though when initial engagement of the sliding coupling element is obstructed yieldable and delayed driving engagement with said driven shaft.

14. In a reverse gear and clutch mechanism, a housing, a drive shaft, a driven shaft, an intermediate shaft interposed between the drive shaft and driven shaft, positively operated lever-loaded friction clutch means operatively connecting the drive shaft with the intermediate shaft, constant mesh reverse gears operatively connected with the intermediate shaft, a sliding coupling element on the driven shaft for selective engagement with the intermediate shaft and with the reverse gears, independent operating means for said friction clutch and coupling element, a common actuating means for said independent operating means, and means connecting said independent operating means adapted to provide a firm though, when initial engagement of the sliding coupling element is obstructed, yieldable and delayed driving engagement with said driven shaft.

15. In a reverse gear and clutch mechanism, a housing, a drive shaft, a driven shaft, an intermediate shaft interposed between the drive shaft and driven shaft, positively operated lever-loaded friction clutch means operatively connecting the drive shaft with the intermediate shaft, reverse gears operatively connected with the intermediate shaft, a sliding coupling element on the driven shaft for selective engagement with the intermediate shaft and with the reverse gears, operating means for said friction clutch, a connecting means between said operating means and said coupling element, and including means providing a firm though when initial engagement of the sliding coupling element is obstructed, yieldable, and delayed driving engagement with said driven shaft.

16. In a reverse gear and clutch mechanism, a housing, the drive shaft, a driven shaft, an intermediate shaft interposed between the drive shaft and driven shaft, positively operated lever-loaded friction clutch means operatively connecting the drive shaft with the intermediate shaft, reverse gears operatively connected with the intermediate shaft, a sliding coupling element connected with the intermediate shaft, a sliding coupling element on the driven shaft for selective engagement with the intermediate shaft and with the reverse gears, independent operating means for said friction clutch and coupling element, a common actuating means for said independent operating means, and linkage between said common actuating means and said sliding coupling element adapted to provide a delayed driving engagement with said driven shaft.

17. In a reverse gear and clutch mechanism, a housing, the drive shaft, a driven shaft, an intermediate shaft interposed between the drive shaft and driven shaft, friction clutch means operatively connecting the drive shaft with the intermediate shaft, reverse gears operatively connected with the intermediate shaft, a sliding coupling element on the driven shaft for selective engagement with the intermediate shaft and with the reverse gears, independent operating means for said friction clutch and coupling element, a common actuating means for said independent operating means, means providing upon obstruction of said sliding coupling element yieldable and momentarily delayed driving engagement with said driven shaft, and yieldable means adapted to resist any movement of said common actuating means from either of its extreme positions.

18. In a reverse gear and clutch mechanism, a housing, the drive shaft, a driven shaft, an intermediate shaft interposed between the drive shaft and driven shaft, friction clutch means operatively connecting the drive shaft with the intermediate shaft, reverse gears operatively connected with the intermediate shaft, a sliding coupling element on the driven shaft for selective engagement with the intermediate shaft and with the said reverse gears, independent operating means for said friction clutch and coupling element, a common actuating means for said independent operating means, and means providing upon obstruction of said sliding coupling element yieldable and momentarily delayed driving engagement with said driven shaft, and yieldable means adapted to resist any movement of said common actuating means from either of its extreme positions to neutral position but having no effect at said neutral position.

ROY M. UPTON.